US011001104B2

(12) United States Patent
Ogawa et al.

(10) Patent No.: US 11,001,104 B2
(45) Date of Patent: May 11, 2021

(54) RUN-FLAT RADIAL TIRE

(71) Applicant: BRIDGESTONE CORPORATION, Tokyo (JP)

(72) Inventors: Gaku Ogawa, Tokyo (JP); Souto Nakayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 189 days.

(21) Appl. No.: 16/096,850

(22) PCT Filed: Apr. 27, 2017

(86) PCT No.: PCT/JP2017/016846
§ 371 (c)(1),
(2) Date: Oct. 26, 2018

(87) PCT Pub. No.: WO2017/188408
PCT Pub. Date: Nov. 2, 2017

(65) Prior Publication Data
US 2019/0135052 A1    May 9, 2019

(30) Foreign Application Priority Data

Apr. 28, 2016  (JP) .............................. JP2016-091923

(51) Int. Cl.
*B60C 17/06*    (2006.01)
*B60C 11/12*    (2006.01)
(Continued)

(52) U.S. Cl.
CPC ............ *B60C 17/0009* (2013.01); *B60C 9/18* (2013.01); *B60C 9/28* (2013.01); *B60C 11/01* (2013.01);
(Continued)

(58) Field of Classification Search
CPC . B60C 11/12; B60C 11/1259; B60C 11/1272; B60C 2011/1268; B60C 2011/1286; B60C 17/06
See application file for complete search history.

(56) References Cited

U.S. PATENT DOCUMENTS 6,073,668 A * 6/2000 Iwasaki ................... B60C 11/00
152/209.14
2010/0065174 A1 * 3/2010 Matsunaga ............... B60C 3/06
152/209.14
(Continued)

FOREIGN PATENT DOCUMENTS

EP      0 911 188 A1    4/1999
JP      8-2220    *    1/1996
(Continued)

OTHER PUBLICATIONS

Machine translation of JP 8-2220, 1996.*
(Continued)

*Primary Examiner* — Justin R Fischer
(74) *Attorney, Agent, or Firm* — Oliff PLC (57) ABSTRACT

A tire includes a carcass, side-reinforcing rubber, a belt layer, and a tread. The belt layer includes at least two layers and is provided at a tire radial direction outer side of the carcass, each layer including a cord inclined with respect to a tire circumferential direction such that the cords of the belt layers intersect each other. The tread is provided at the tire radial direction outer side of the belt layer. A tire cross-section height SH satisfies SH≥145 mm, and a ground contact width TW of the tread and a maximum tire width direction width of the belt layer satisfies TW<B. Moreover, an angle θ formed between a tire outer face and the tire width direction at a position at 0.8SH toward the tire radial (Continued)

direction outer side of a bead base portion of either of the bead portions is no less than 60°.

22 Claims, 5 Drawing Sheets

(51) Int. Cl.
    *B60C 17/00*     (2006.01)
    *B60C 11/01*     (2006.01)
    *B60C 9/18*     (2006.01)
    *B60C 9/28*     (2006.01)
    *B60C 11/03*     (2006.01)
    *B60C 15/06*     (2006.01)

(52) U.S. Cl.
    CPC ...... *B60C 11/0327* (2013.01); *B60C 15/0603* (2013.01); *B60C 2011/0334* (2013.01); *B60C 2017/0072* (2013.01)

(56) References Cited

U.S. PATENT DOCUMENTS

2017/0057300 A1    3/2017    Sakurai
2017/0100969 A1    4/2017    Yokoyama
2017/0297383 A1    10/2017    Hatanaka et al.

FOREIGN PATENT DOCUMENTS

| | | |
|---|---|---|
| JP | H08-025923 A | 1/1996 |
| JP | 2002-301914 A | 10/2002 |
| JP | 2004-189106 A | 7/2004 |
| JP | 2010-105559 A | 5/2010 |
| JP | 2013-095369 A | 5/2013 |
| JP | 2015-155263 A | 8/2015 |
| JP | 2015-199377 A | 11/2015 |
| JP | 2015-214306 A | 12/2015 |
| WO | 2016/051651 A1 | 4/2016 |

OTHER PUBLICATIONS

Jun. 6, 2017 International Search Report issued in International Patent Application No. PCT/JP2017/016846.

Feb. 14, 2019 Extended European Search Report issued in European Patent Application No. 17789689.1.

\* cited by examiner

RUN-FLAT RADIAL TIRE

TECHNICAL FIELD

The present disclosure relates to a run-flat radial tire.

BACKGROUND ART

Japanese Patent Application Laid-Open (JP-A) No. 2013-95369 discloses a side reinforced run-flat radial tire in which a tire side portion is reinforced by side-reinforcing rubber so as to secure durability during run-flat running (during abnormal running with reduced tire pressure).

SUMMARY OF INVENTION

Technical Problem

As explained in JP-A No. 2013-95369 described above, recently there is demand for run-flat radial tires with a comparatively large tire cross-section height. Various issues, including the following, may arise during run-flat running with such run-flat radial tires.

(1) Due to having a large tire cross-section height, vertical deflection under perpendicular load has a large absolute value. This results in a large amount of buckling at the tread face of a tread.

(2) As a result of this buckling and also of belt layer asymmetry, the belt layer twists in a slip angle direction, generating lateral force which causes asymmetrical deformation. In particular, run-flat radial tires with a large tire cross-section height have low lateral direction rigidity in a run-flat running state, resulting in a greater amount of asymmetrical deformation.

(3) When the tread face moves in the tire width direction (namely, undergoes asymmetrical deformation) due to this asymmetrical deformation in a state with a large amount of buckling, on a lateral force input side (namely, the side on which lateral force is input), ground contact occurs spanning from a region where the belt layer is present toward the width direction outside where the belt layer is not present.

(4) Since ground contact occurs in a region where the belt layer is not present on the lateral force input side, force toward the width direction outside arising at both the lateral force input side end and a lateral force output side end of the ground contact face is reduced, thereby increasing an imbalance in force toward the width direction outside between the lateral force input side and the lateral force output side. Due to the increase in this imbalance, tire width direction movement of the tread face is exacerbated, resulting in even greater asymmetrical deformation.

(5) When tire width direction movement of the tread face increases, deflection of the side-reinforcing rubber on the lateral force output side increases, negatively affecting run-flat durability.

(6) The phenomena in which asymmetrical deformation becomes even greater as described in (3) and (4) above is particularly prevalent in run-flat radial tires with a tire cross-section height of 145 mm or greater, and the negative effect on run-flat durability caused by asymmetrical deformation is a particular issue in these tires compared to run-flat radial tires with a tire cross-section height of less than 145 mm.

In consideration of the above circumstances, an object of the present disclosure is to suppress asymmetrical deformation during run-flat running and to increase durability during run-flat running.

Solution to Problem

A run-flat radial tire according to a first aspect includes a carcass, side-reinforcing rubber, a belt layer, and a tread. The carcass straddles between a pair of bead portions. The side-reinforcing rubber is provided at a tire side portion, and extends in a tire radial direction along an inner face of the carcass. The belt layer includes at least two layers and is provided at a tire radial direction outer side of the carcass, each layer including a cord extending in a direction inclined with respect to a tire circumferential direction such that the cords of the belt layer intersect each other as viewed along the tire radial direction. The tread is provided at the tire radial direction outside of the belt layer. A tire cross-section height SH satisfies SH≥145 mm, and a ground contact width TW of the tread and a maximum tire width direction width B of the belt layer satisfy TW<B. Moreover, in a tire width direction cross-section view, an angle θ formed between a tire outer face and the tire width direction at a position at 0.8 SH toward the tire radial direction outer side of a bead base portion of the bead portions is no less than 60°.

In this run-flat radial tire, TW<B, and the angle θ is no less than 60°. Accordingly, even if even if a large amount of buckling and asymmetrical deformation occur in the tread during run-flat running, ground contact outside the original ground contact region (namely, the tread) is suppressed. Thus, an imbalance toward the width direction outside is not liable to occur between a lateral force input side and a lateral force output side during run-flat running, thus suppressing an increase in asymmetrical deformation. This enables durability to be increased during run-flat running.

A run-flat radial tire according to a second aspect is the run-flat radial tire of the first aspect, wherein, in a tire width direction cross-section view, a radius of minimum curvature of a side wall upper portion of the tire side portion positioned on a tread side of the tire side portion is no greater than 40 mm.

In this run-flat radial tire, the minimum radius of curvature of the side wall upper portion is no greater than 40 mm. Accordingly, even if the ground contact region attempts to move outside the original ground contact region (namely, the tread) toward the side wall upper portion side during run-flat running, a tread end portion projects out due to the radius of curvature being a small radius of no greater than 40 mm, thereby strongly resisting such movement. Ground contact outside the original ground contact region (namely, the tread) is thereby suppressed.

A run-flat radial tire according to a third aspect is the run-flat radial tire of the first aspect or the second aspect, wherein a distance WA between belt layer side ends of the side-reinforcing rubber on either tire width direction side and the ground contact width TW of the tread satisfy WA≤0.9 TW.

In this run-flat radial tire, WA≤0.9 TW. The range over which the ground contact region of the tread and the side-reinforcing rubber overlap each other is thereby increased. This increases the cross-sectional bending rigidity of the ground contact end portions, and thereby suppresses asymmetrical deformation during run-flat running. This enables durability during run-flat running to be increased.

A run-flat radial tire according to a fourth aspect is the run-flat radial tire of any one of the first aspect to the third aspect, wherein the maximum tire width direction width B of the belt layer satisfies B/TW≥1.0.

In this run-flat radial tire, B/TW≥1.0. Thus, the maximum width of the belt layer in the tire width direction is greater than the ground contact width TW of the tread. Accordingly, the ground contact portion on a lateral force input side does not bulge out to the width direction outside where the belt layer is not present due to asymmetrical deformation during run-flat running, thereby suppressing an increase in asymmetrical deformation. This enables durability during run-flat running to be further increased.

A run-flat radial tire according to a fifth aspect is the run-flat radial tire of any one of the first aspect to the fourth aspect, wherein a tire maximum width W satisfies TW/W≥0.5.

In this run-flat radial tire, TW/W≥0.5. Thus, there is a greater change in the angle of an outer face from the tread to the tire side portion in a tire width direction cross-section view, such that the ground contact position of the tread is not liable to move toward the tire width direction outside. Thus, the ground contact portion on the lateral force input side does not bulge out to the width direction outside where the belt layer is not present due to asymmetrical deformation during run-flat running, thereby suppressing an increase in asymmetrical deformation.

A run-flat radial tire according to a sixth aspect is the run-flat radial tire of any one of the first aspect to the fifth aspect, wherein a rim width RW satisfies TW/RW≥0.7.

In this run-flat radial tire, TW/RW≥0.7. Thus, there is a greater change in the angle of the outer face from the tread to the tire side portion in a tire width direction cross-section view, such that the ground contact position of the tread is not liable to move toward the tire width direction outside. Asymmetrical deformation during run-flat running is thereby suppressed.

Advantageous Effects of Invention

The run-flat radial tire according to the present disclosure is capable of suppressing asymmetrical deformation during run-flat running, and capable of increasing durability during run-flat running.

DESCRIPTION OF EMBODIMENTS

Explanation follows regarding an exemplary embodiment of a run-flat radial tire of the present disclosure, based on the drawings.

Figure 1:
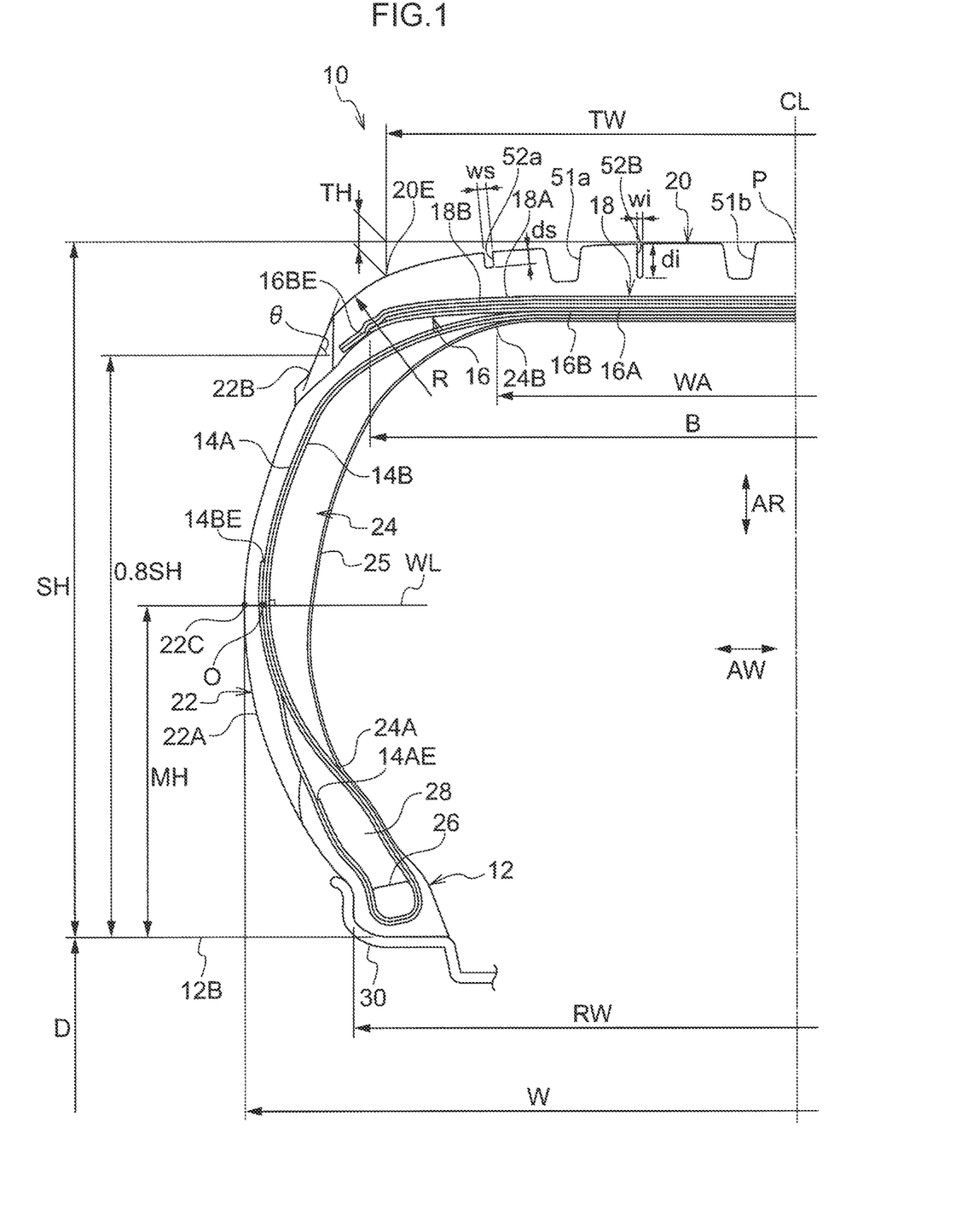
FIG. 1 is a half cross-section illustrating a cross-section of one side of a run-flat radial tire according to an exemplary embodiment of the present disclosure in a rim-assembled state, as sectioned along a tire width direction and a tire radial direction.

FIG. 1 illustrates a cross-section of one side of a run-flat radial tire 10 (hereafter referred to as the tire 10) of the present exemplary embodiment as sectioned along a tire width direction and a tire radial direction (namely, a cross-section viewed along a direction following a tire circumferential direction). Note that in the drawings, the arrow AW indicates the width direction of the tire 10 (hereafter referred to as tire width direction), and the arrow AR indicates the radial direction of the tire 10 (hereafter referred to as the tire radial direction). The tire width direction refers to a direction parallel to a rotation axis of the tire 10. The tire radial direction refers to a direction orthogonal to the rotation axis of the tire 10. The reference numeral CL indicates an equatorial plane of the tire 10 (hereafter referred to as the tire equatorial plane).

In the present exemplary embodiment, the side closer to the rotation axis of the tire 10 along the tire radial direction is referred to as the "tire radial direction inside", and the side further from the rotation axis of the tire 10 along the tire radial direction is referred to as the "tire radial direction outside". The side closer to the tire equatorial plane CL along the tire width direction is referred to as the "tire width direction inside", and the sides further from the tire equatorial plane CL along the tire width direction are referred to as the "tire width direction outside".

Tire

FIG. 1 illustrates the tire 10 when assembled to a rim 30 and inflated to a standard pressure. The rim 30 is a standard rim. Note that the "standard rim" referred to here is a standard rim (or "approved rim" or "recommended rim") of the applicable size as specified in the 2015 edition of the Year Book of the Japan Automobile Tire Manufacturers Association (JATMA), and has a rim width RW, described later, also specified therein. The "standard pressure" is the air pressure corresponding to the maximum load (namely, maximum load capacity) of a single wheel as specified in the same Year Book. "Standard load" refers to the maximum load (namely, maximum load capacity) of a single wheel of the applicable size specified in the same Year Book. The tire dimensions are as measured in a state in which the tire has been assembled to the standard rim and inflated to the standard pressure. A ground contact width TW of a tread 20 is the ground contact width in the tire width direction directly under the load when applied with the standard load.

The standards applied are determined by the Industrial Standards prevailing in the region of tire manufacture or use, for example the standards set out in the Year Book of the Tire and Rim Association Inc. in the United States of America, the standards set out in the Standards Manual of the European Tyre and Rim Technical Organisation in Europe, and the standards set out in the JATMA Year Book of the Japan Automobile Tire Manufacturers Association in Japan.

As illustrated in FIG. 1, the tire 10 includes a carcass 14 that straddles between a pair of bead portions 12, side-reinforcing rubber 24 that is provided to each tire side portion 22 and that extends along an inner face of the carcass 14 in the tire radial direction, belt layer 16 that are provided at the tire radial direction outside of the carcass 14, and the tread 20 provided at the tire radial direction outside of the belt layer 16. Note that only the bead portion 12 on one side is illustrated in FIG. 1.

Reinforcing cord layer 18 are provided at the tire radial direction outside of the belt layer 16. The tread 20, configuring an outer circumferential portion of the tire 10, is provided further toward the tire radial direction outside than the reinforcing cord layer 18. Each tire side portion 22 is configured by a side wall lower portion 22A on the corresponding bead portion 12 side and a side wall upper portion 22B on the tread 20 side, and couples the corresponding bead portion 12 and the tread 20 together.

As illustrated in FIG. 1, for example, a tire cross-section height (section height) SH of the tire 10 of the present exemplary embodiment is set between 145 mm and 500 mm. The tire cross-section height SH is more preferably set to no greater than 250 mm. Note that "tire cross-section height SH" refers here to a length that is half of the difference between a tire external diameter and a rim diameter D in a state in which the tire 10 has been assembled to the rim 30 (standard rim) and inflated to the standard pressure. Furthermore, the "tire external diameter" refers to the distance from a point P (see FIG. 1) on a tread face of the tread 20 at the tire equatorial plane CL to a similar point P with line symmetry across the tire axis. The "rim diameter" refers to the rim diameter specified in the 2015 edition of the Year Book of the Japan Automobile Tire Manufacturers Association (JATMA).

Although the size of the tire 10 is 235/65R17 in the present exemplary embodiment, exemplary embodiments of the present disclosure are not limited thereto, and the tire size may be 245/60R18, 255/65R18, 235/65R18, 215/70R16, or the like.

Bead Portions

As illustrated in FIG. 1, a bead core 26 is embedded in each of the pair of bead portions 12. The carcass 14 straddles between the bead cores 26. Various structures may be adopted for the bead cores 26 of a pneumatic tire, and each bead core 26 may have a circular shaped or polygonal shaped cross-section profile. A hexagonal shape may be adopted as an example of a polygonal shape. A rubber layer, a cord layer, or the like may be further provided to the bead portions 12 for reinforcement purposes, and such an additional member may be provided at various positions with respect to the carcass 14 and a bead filler 28.

Carcass

The carcass 14 is configured by two carcass plies 14A, 14B (the carcass ply disposed at the tire radial direction outside at the tire equatorial plane CL being the carcass ply 14A, and the carcass ply disposed at the tire radial direction inside being the carcass ply 14B). The carcass plies 14A, 14B are each formed by covering plural cords with covering rubber.

The carcass 14 formed in this manner extends from one bead core 26 to the other bead core 26 in a toroidal shape, and configures a frame of the tire. End portion sides of the carcass 14 are anchored to the bead cores 26. Specifically, each end portion side of the carcass 14 is folded back around the corresponding bead core 26 from the tire width direction inside to the tire width direction outside, and anchored. Folded-back end portions (namely, end portions 14AE, 14BE) of the carcass 14 are disposed at the corresponding tire side portion 22. The end portions 14AE of the carcass ply 14A are disposed further toward the tire radial direction inside than the end portions 14BE of the carcass ply 14B.

Note that although the present exemplary embodiment is configured such that the end portions of the carcass 14 are disposed at the tire side portions 22, the present disclosure is not limited to this configuration, and may for example be configured such that the end portions of the carcass 14 are disposed at the tread 20. Moreover, a structure may be adopted in which each end portion side of the carcass 14 is wedged between plural bead cores 26 and wrapped around the bead cores 26 without being folded back.

Note that the position of a tire maximum width W (namely, the tire radial direction position of a straight line WL) is no less than 0.6 SH to the tire radial direction outside of a bead base portion 12B. Namely, in FIG. 1, a height MH≥0.6 SH. A tire radial direction position where the width of the carcass 14 is greatest (the position indicated by the reference point O in FIG. 1) substantially corresponds to the position of the tire maximum width W. Note that the straight line WL is a straight line running along the tire width direction from a tire width direction end portion 22C of the tire side portion 22. The reference point O is the point where the straight line WL and a tire width direction outer face of the carcass 14 intersect each other.

Note that in the present exemplary embodiment, the carcass 14 configures a radial carcass. There is no particular limitation to the materials employed in the carcass 14, and rayon, nylon, polyethylene naphthalate (PEN), polyethylene terephthalate (PET), aramid, glass fibers, carbon fibers, steel, or the like may be adopted. Note that organic fiber cord is preferable from the perspective of weight reduction. Although between 20 to 60 strands/50 mm are provided in the carcass 14, there is no limitation to this range.

The bead filler 28, which extends from each bead core 26 toward the tire radial direction outside, is embedded in a region of each bead portion 12 surrounded by the carcass 14. The thickness of the bead filler 28 decreases on progression toward the tire radial direction outside. Note that a structure may be applied in which the bead filler 28 is not provided to the bead portions 12.

Belt Layer

The belt layer 16 laid at the tire radial direction outside of the carcass 14. The belt layer 16 is configured by at least two belt plies. In the present exemplary embodiment as an example, the belt layer 16 is configured by two belt plies 16A, 16B. Note that the 'belt layer that includes at least two layers' in the present disclosure indicates the belt layer configured by at least two belt plies. Of the belt layer 16, the belt ply 16A is disposed at the tire radial direction outside. The belt ply 16B is disposed at the tire radial direction inside of the belt ply 16A. The belt plies 16A, 16B are each formed by covering plural cords (such as organic fiber cords or metal cords) with covering rubber. The cords configuring the belt plies 16A, 16B extend in directions inclined with respect to the tire circumferential direction. The respective cords configuring the belt plies 16A, 16B intersect each other as viewed along the tire radial direction. The angles of incline of the cords are preferably no less than 10° with respect to the tire circumferential direction. Note that the tire width direction width (length) of the belt ply 16A is narrower (shorter) than the tire width direction width (length) of the belt ply 16B.

Note that the belt layer 16 may also be configured by a single belt ply. However, radial tires employed in passenger cars have a size with a narrow width and large diameter, and so distortion of the ground contact face shape while turning is liable to occur when only one belt ply is applied. It is therefore preferable to include two or more belt plies with cords extending in directions crossing each other. A configuration in which two crossing belt plies are formed is preferable in pneumatic radial tires employed in passenger cars.

Note that steel cord is the most widely employed material in cases in which metal cord is employed as the cord of the belt plies 16A, 16B. Steel cord has a main component of steel and may include a minor amount of various other substances, such as carbon, manganese, silicon, phosphorus, sulfur, copper, or chrome.

Monofilament cord, or cord in which plural filaments are twisted together, may be employed as the cord. Various twisting structure designs may be adopted, and various cross-section structures, twisting pitches, twisting directions, and distances between adjacent filaments may be employed. Furthermore, cord in which filaments of different materials are twisted together may be employed, and there is no particular limitation to the cross-section structure, for which various twisting structures, such as single twists, layered twists, plural twists, or the like may be adopted.

Reinforcing Cord Layer

The reinforcing cord layer 18 are provided at the tire radial direction outside of the belt layer 16. The reinforcing cord layer 18 are configured by two reinforcing plies 18A, 18B (the reinforcing ply disposed at the tire radial direction outside being the reinforcing ply 18A, and the reinforcing ply disposed at the tire radial direction inside being the reinforcing ply 18B). The reinforcing ply 18A is formed with a substantially same tire width direction width (length) as the reinforcing ply 18B, and completely covers the belt layer 16. The reinforcing plies 18A, 18B are each formed by arraying parallel plural cords (such as organic fiber cords or metal cords) at an angle substantially parallel to the tire circumferential direction.

Note that meandering cord may be employed in the reinforcing cord layer 18 in order to raise the breaking strength. Similarly, high elongation cord (with an elongation at break between 4.5% and 5.5%, for example) may be employed in order to raise the breaking strength.

In the present exemplary embodiment as an example, polyethylene terephthalate (PET) is employed as the cord configuring the reinforcing cord layer 18. However, various materials may be employed as the cord, such as rayon, nylon, polyethylene naphthalate (PEN), aramid, glass fibers, carbon fibers, or steel. Note that organic fiber cord is particularly preferable from the perspective of weight reduction.

Monofilament cord, cord in which plural filaments are twisted together, or hybrid cord in which filaments of different materials are twisted together may be employed as the cord. Although the cord is provided in a range of between 20 to 60 strands/50 mm, there is no limitation to this range.

Moreover, the tire width direction rigidity, material, number of layers, density, and so on of the reinforcing cord layer 18 may be varied so as to be distributed according to the specifications of the tire 10. Although the tire width direction widths (lengths) of the reinforcing plies 18A, 18B are substantially the same in the present exemplary embodiment as an example, the present disclosure is not limited to this configuration. For example, the reinforcing ply 18A may be narrower (shorter) or wider (longer) than the reinforcing ply 18B. In either case, a gradual change in rigidity is achieved at end portions of the tread 20, thereby suppressing localized damage. Alternatively, the number of layers may be increased at tire width direction end portions only, or the number of layers may be increased at a center portion only. Alternatively, the reinforcing cord layer 18 may be omitted.

The reinforcing cord layer 18 may be designed with a wider width or a narrower width than the belt layer 16. For example, the reinforcing cord layer 18 may be configured with a width that is between 90% and 110% of a maximum width belt layer having the greatest width out of the belt layer 16 (corresponding to the belt ply 16B in the present exemplary embodiment).

Tread

Figure 2:
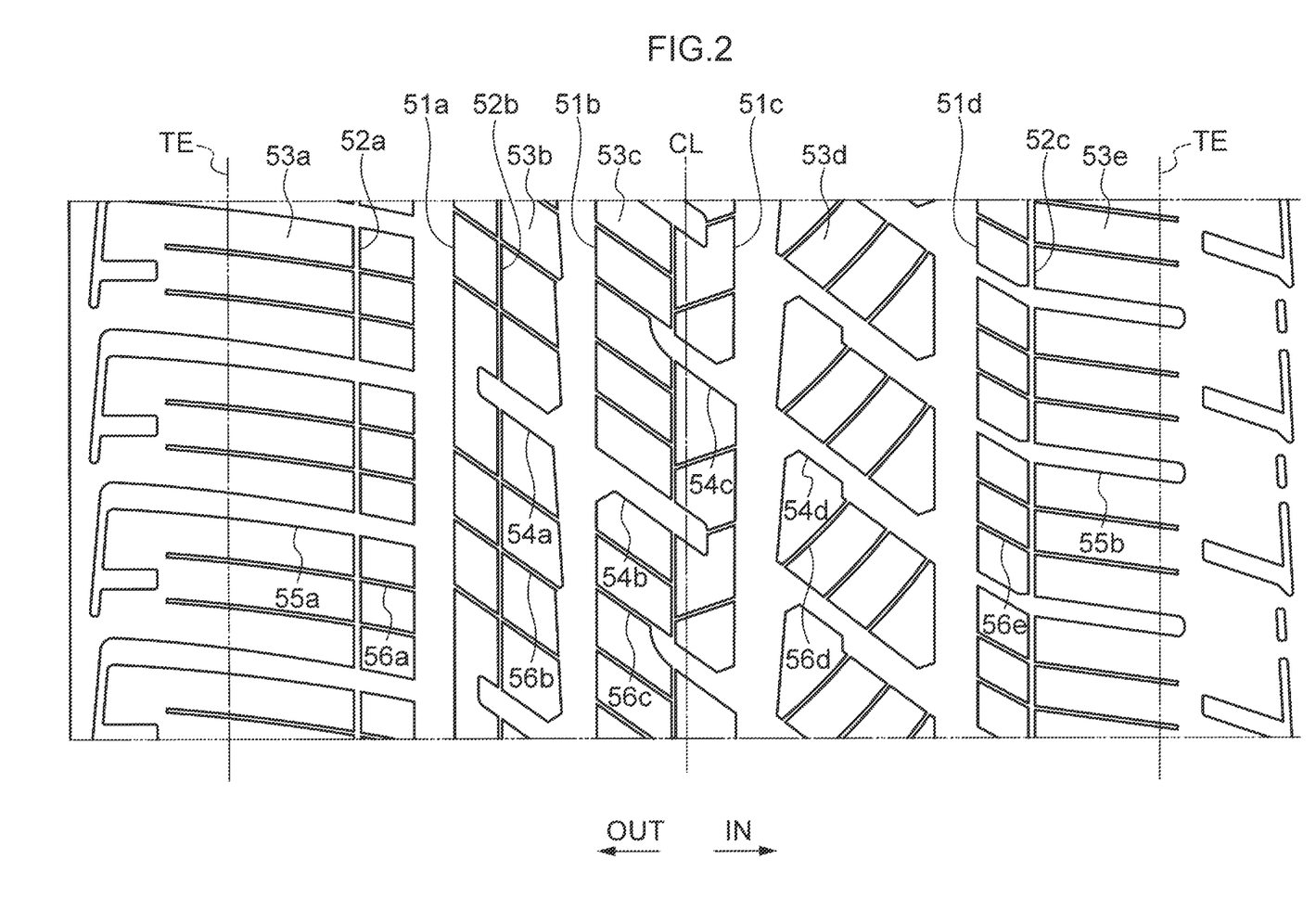
FIG. 2 is an opened-out view illustrating part of a configuration of a tread face of a tread.

The tread 20 illustrated in FIG. 1 and FIG. 2 is provided at the tire radial direction outside of the belt layer 16 and the reinforcing cord layer 18. The tread 20 is a location that makes contact with the road surface when running. The tread face of the tread 20 is formed with plural circumferential direction grooves 51 extending around the tire circumferential direction. Plural width direction grooves, not illustrated in the drawings, are formed extending along the tire width direction in the tread 20 so as to place the circumferential direction grooves 51 in communication with each other. The shape and number of circumferential direction grooves 51 and width direction grooves are set as appropriate according to the performance required of the tire 10, such as in water expelling performance and steering stability. Thus, the width direction grooves may be sipes, lateral grooves terminating inside rib shaped land portions, or may be configured by a combination thereof.

Although negative ratios of tire half portions at a vehicle installation direction inside and at a vehicle installation direction outside on either side of the tire equatorial plane CL are the same as each other in the present exemplary embodiment, exemplary embodiments of the present disclosure are not limited thereto. For example, in cases in which the installation direction of the tire is specified, a difference may be provided between the negative ratios of the tire half portions at the vehicle installation direction inside and at the vehicle installation direction outside on either side of the tire equatorial plane CL.

Out of the rib shaped land portions, various configurations may be employed for the rib shaped land portion on each shoulder, which is demarcated by the corresponding tire width direction outermost circumferential direction groove 51 and a tire width direction end portion of the tread 20 (namely, a tread face outer end portion 20E). For example, in tires in which the vehicle installation direction is specified, the tire width direction lengths of the rib shaped shoulder land portions at the installation direction outside and at the installation direction inside may be different from each other. Note that when steering stability is a consideration, the tire width direction length of the rib shaped shoulder land portion at the installation direction outside is preferably larger than the tire width direction length of the rib shaped shoulder land portion at the installation direction inside.

In the tire 10, taking a tire radial direction distance between the tread face outer end portion 20E at the tire width direction outside of the tread 20 and the point P on the tread surface of the tread 20 at the tire equatorial plane CL as a tread height difference TH (mm), the tread height difference TH is preferably set so as to be no greater than 4.5% of the tread width TW (mm). Setting TH/TW in this range enables a crown portion of the tire to be made flatter (namely, with a more flattened profile), the ground contact surface area to be increased, input (namely, pressure) from the road surface to be lessened, the tire radial direction deflection ratio to be reduced, and the durability and wear resistance of the tire to be improved.

Note that although a single layer of tread rubber is employed as the tread 20 in the present exemplary embodiment, exemplary embodiments of the present disclosure are not limited to this configuration. For example, the tread rubber may be formed by plural different layers of rubber in the tire radial direction. Rubber layers, each with a different loss tangent, modulus, hardness, glass transition temperature, material, or the like, may be employed as such plural rubber layers. Ratios of the tire radial direction thicknesses of the plural rubber layers may differ in the tire width direction, or rubber layers that are different to their surroundings may, for example, be provided only at the bottoms of the circumferential direction grooves.

Furthermore, the tread rubber may be formed by plural different layers of rubber in the tire width direction. Rubber layers, each with a different loss tangent, modulus, hardness, glass transition temperature, material, or the like, may be employed as such plural rubber layers. Ratios of the tire width direction lengths of the plural rubber layers may differ in the tire radial direction, or rubber layers that are different to their surroundings may, for example, be provided in only limited, localized regions, such as in the vicinity of the circumferential direction grooves only, in the vicinity of the tread ends only, at the shoulder land portions only, or at a center land portion only.

Tread Pattern

FIG. 2 is an opened-out view illustrating a partial configuration of the tread face of the tread 20. The tire 10 has what is referred to a specified installation direction pattern, in which the installation direction of the tire 10 to a vehicle is specified. In FIG. 2, the vehicle mounting outside is indicated by the arrow OUT and the vehicle mounting inside is indicated by the arrow IN.

In the tire 10, an outermost circumferential direction groove 51a (sometimes simply referred to as the circumferential direction groove 51a in the following explanation) and a circumferential direction groove 51b extending around the tire circumferential direction, and a shoulder portion circumferential direction sipe 52a and an inside circumferential direction sipe 52b extending around the tire circumferential direction, are provided in at least one tread half-width region of the tread face from out of a pair of tread half-width regions on either side of the tire equatorial plane CL, this being the tread half-width region on the vehicle mounting outside of the tread face in the illustrated example.

The shoulder portion circumferential direction sipe 52a is disposed in a shoulder land portion 53a demarcated by a tread ground contact end TE and the outermost circumferential direction groove 51a, and the inside circumferential direction sipe 52b is disposed in an inside land portion 53b adjacent to the outermost circumferential direction groove 51a on the tire width direction inside. Note that in the present exemplary embodiment, a sipe refers to a narrow groove with a width capable of closing up on ground contact, for example a width no greater than 2 mm.

In the present exemplary embodiment, providing the respective circumferential direction sipes to the shoulder land portion 53a and the inside land portion 53b in this manner enables an edge effect in response to input in the tire width direction to be increased, thereby realizing an improvement in turning performance on snow.

In the present exemplary embodiment, the sipe width of the shoulder portion circumferential direction sipe 52a is formed wider than that of the inside circumferential direction sipe 52b, and the sipe depth of the shoulder portion circumferential direction sipe 52a is formed shallower than that of the inside circumferential direction sipe 52b. Namely, as illustrated in FIG. 2, if the shoulder portion circumferential direction sipe 52a has a sipe width of ws and a sipe depth of ds, and the inside circumferential direction sipe 52b has a sipe width of wi and a sipe depth of di, then ws>wi, and ds<di.

Note that the sipe width ws of the shoulder portion circumferential direction sipe 52a and the sipe width wi of the inside circumferential direction sipe 52b preferably satisfy the relationship 1.7<ws/wi<2.1, and the sipe depth ds of the shoulder portion circumferential direction sipe 52a and the sipe depth di of the inside circumferential direction sipe 52b preferably satisfy the relationship 1.6<di/ds<1.9. Maintaining the sipe width and sipe depth ratios within these ranges enables a good balance between performance on snow and wear resistance to be obtained.

In the pattern illustrated in FIG. 2, four circumferential direction grooves 51a to 51d extending in the tire circumferential direction are formed in the tread 20, and five land portions 53a to 53e that are demarcated by the four circumferential direction grooves 51a to 51d and the tread ground contact ends TE are also provided. There is no circumferential direction groove present at the tire equatorial plane CL in the illustrated pattern. Lug grooves 54a, 54b respectively extend toward both tire width direction sides from the circumferential direction groove 51b, and lug grooves 54c, 54d respectively extend toward both tire width direction sides from the circumferential direction groove 51c. The lug grooves 54d are in communication with the outermost circumferential direction groove 51d. Lateral grooves 55a extend toward the tire width direction outside from the outermost circumferential direction groove 51a, and lateral grooves 55b extend toward the tire width direction outside from the outermost circumferential direction groove 51d. Note that the reference numerals 56a to 56e indicate sipes disposed in communication with the respective circumferential direction grooves.

As illustrated in FIG. 1, in a tire width direction cross-section view, an upper end portion 24B of the side-reinforcing rubber 24 is positioned further toward the tire width direction inside than the shoulder portion circumferential direction sipe 52a. A large ground contact pressure is particularly likely in a region where the side-reinforcing rubber 24 and the shoulder land portion 53a overlap each other in the tire width direction, and so providing the shoulder portion circumferential direction sipe 52a in this region enables an even greater edge effect to be obtained.

Tire Side Portions

The tire side portions 22 extend in the tire radial direction so as to link the corresponding bead portions 12 and the tread 20 together, and are configured so as to be able to bear load acting on the tire 10 during run-flat running. The tire width direction end portions 22C of both tire side portions 22 may be provided within a range of between 50% and 90% of the tire cross-section height SH toward the tire radial direction outside from the corresponding bead base portion 12B.

Note that turbulence-inducing protrusions may be provided to the tire side portions 22. In such cases, turbulence induced by the turbulence-inducing protrusions cools the tire side portions 22, enabling run-flat running performance to be further improved. The turbulence-inducing protrusions may be provided to either tire outer faces or to tire inner faces of the tire side portions. The turbulence-inducing protrusions may also be provided to both the tire outer faces and the tire inner faces, and in cases in which the installation direction of the tire is specified, the turbulence-inducing protrusions may be provided to only one side portion out of the pair of tire side portions. Furthermore, providing dimples to the tire side portions so as to increase the surface area and increase heat dissipation enables run-flat running performance to be further improved.

Side-Reinforcing Rubber

Each tire side portion 22 is provided with the side-reinforcing rubber 24 that reinforces the tire side portion 22 at the tire width direction inside of the carcass 14. The side-reinforcing rubber 24 is reinforcing rubber to allow running for a predetermined distance in a state supporting the weight of the vehicle and its occupants in cases in which the pressure of the tire 10 has dropped due to a puncture or the like.

Although the side-reinforcing rubber 24 is formed of a single type of rubber material in the present exemplary embodiment, exemplary embodiments of the present disclosure are not limited thereto, and the side-reinforcing rubber 24 may be formed of plural types of rubber material. As long as the main component is a rubber material, the side-reinforcing rubber 24 may also include other materials, such as filler, short fibers, or resin. The rubber material configuring the side-reinforcing rubber 24 may also include a rubber material with a hardness between 70 and 85 in order to increase durability during run-flat running. Moreover, a rubber material may be included that has a physical property of a loss coefficient tan $\delta$ of no greater than 0.10, as measured using a viscosity spectrometer (for example a spectrometer manufactured by Toyo Seiki Seisaku-sho, Ltd.) under conditions of frequency 20 Hz, initial strain 10%, dynamic strain±2%, and temperature 60° C. Note that rubber hardness refers here to hardness as specified by JIS K6253 (type A durometer).

Although the side-reinforcing rubber 24 with a main component of rubber is employed in the present exemplary embodiment as an example of a side reinforcing layer of the present disclosure, there is no limitation thereto. A side reinforcing layer having a main component of another material with similar elasticity to rubber (such as a thermoplastic resin) may be employed instead.

The side-reinforcing rubber 24 extends in the tire radial direction along the inner face of the carcass 14 from the bead portion 12 side toward the tread 20 side. The side-reinforcing rubber 24 has a shape such as a substantially crescent shape, with decreasing thickness on progression from a center portion toward the bead portion 12 side and toward the tread 20 side. Note that the thickness of the side-reinforcing rubber 24 here refers to the length along a line normal to the carcass 14 in a state in which the tire 10 has been assembled to the rim 30 and inflated to the standard pressure.

A lower end portion 24A on the bead portion 12 side of the side-reinforcing rubber 24 overlaps with the bead filler 28 across the carcass 14 as viewed along the tire width direction, and the upper end portion 24B on the tread 20 side of the side-reinforcing rubber 24 overlaps with the belt layer 16 across the carcass 14 as viewed along the tire radial direction. Specifically, the upper end portion 24B of the side-reinforcing rubber 24 overlaps with the belt ply 16B across the carcass 14. Namely, the upper end portion 24B of the side-reinforcing rubber 24 is positioned further toward the tire width direction inside than the end portion 16BE of the belt ply 16B.

Taking the ground contact width of the tread 20 as TW, and the maximum tire width direction width of the belt layer 16 (namely, the width of the belt ply 16B) as B, then TW<B. Moreover, in a tire width direction cross-section view, an angle $\theta$ formed between the tire outer face and the tire width direction at a position of 0.8SH toward the tire radial direction outside from the bead base portion of the bead portion is no less than 60°.

Each of the settings in this paragraph may be applied individually, or a combination of plural of these settings may be applied as appropriate. Alternatively, a configuration that does not employ the below settings may be employed.

In a tire width direction cross-section view, a minimum radius of curvature R of the side wall upper portion 22B positioned on the tread 20 side of each tire side portion 22 is no greater than 40 mm.

Taking a distance between belt layer side ends (upper end portions 24B) of the side-reinforcing rubber 24 on either tire width direction side as WA and the ground contact width of the tread 20 as TW, then WA≤0.9TW. Note that more preferably, WA≤0.8TW.

Moreover, B/TW≥1.0. Note that more preferably, B/TW≥1.05.

Taking the tire maximum width as W, then TW/W≥0.5. Note that more preferably, TW/W≥0.65.

Taking the rim width of the rim 30 as RW, then TW/RW≥0.7. Note that more preferably TW/RW≥0.86.

An inner liner 25 is laid on an inner face of the tire 10 so as to span from one bead portion 12 to the other bead portion 12. Although an inner liner 25 with a main component of butyl rubber is provided as an example in the present exemplary embodiment, there is no limitation thereto. A film layer inner liner with a main component of another rubber material or resin may be laid instead. Note that the inner face of the tire 10 is formed with low air permeability due to the side-reinforcing rubber 24, at least at the inner side of the tire side portions 22, and so a configuration may be applied in which the inner liner 25 is not provided.

A porous member may be disposed or electrostatic flocking may performed on the inner face of the tire 10 in order to reduce cavity resonance noise. Moreover, a sealant member may be provided at the inner face of the tire 10 in order to prevent air from leaking out through a puncture.

Note that although there is no rim guard (rim protection) provided in the present exemplary embodiment due to the high cross-section height SH of the tire 10, the present disclosure is not limited to this configuration, and a rim guard may be provided.

Operation

Explanation follows regarding operation and advantageous effects of the tire 10 of the present exemplary embodiment. In the tire 10 of the present exemplary embodiment, TW<B, and the angle $\theta$ is no less than 60°. Accordingly, even if a large amount of buckling and asymmetrical deformation occur in the tread 20 during run-flat running, ground contact outside the original ground contact region (namely, the tread 20) is suppressed. Thus, an imbalance toward the width direction outside is not liable to occur between a lateral force input side and a lateral force output side during run-flat running, thus suppressing an increase in asymmetrical deformation. This enables durability to be increased during run-flat running.

Moreover, the minimum radius of curvature R of each side wall upper portion 22B is no greater than 40 mm, such that even if the ground contact region attempts to move outside the original ground contact region (namely, the tread) toward the side wall upper portion 22B side during run-flat running, the tread end portion projects out due to the radius of curvature R being a small radius of no greater than 40 mm, thereby strongly resisting such movement. Ground contact outside the original ground contact region (namely, the tread 20) is thereby suppressed.

Furthermore, in the present exemplary embodiment, the tire width direction distance WA between the belt layer side ends 24B of the side-reinforcing rubber 24 on either tire width direction side and the ground contact width TW of the tread 20 satisfy the relationship WA≤0.9 TW. The range over which the ground contact region of the tread and the side-reinforcing rubber overlap each other is thereby increased. Moreover, the maximum width B of the belt layer 16 (namely, the width of the belt ply 16B) and the ground contact width TW of the tread 20 satisfy the relationship B/TW≥1.0. Thus, the maximum width of the belt layers in the tire width direction is greater than the ground contact width of the tread. This setting increases the cross-sectional bending rigidity of the ground contact end portions, and thereby suppresses asymmetrical deformation during run-flat running. Moreover, the ground contact portion on a lateral force input side does not bulge out to the width direction outside where the belt layer 16 are not present due to asymmetrical deformation during run-flat running, thereby suppressing an increase in asymmetrical deformation. This enables durability during run-flat running to be increased.

Moreover, in the tire 10 of the present exemplary embodiment, the ground contact width TW of the tread 20 and the tire maximum width W satisfy the relationship TW/W≥0.5. Further, in the tire 10 of the present exemplary embodiment, the ground contact width TW of the tread 20 and the rim width RW satisfy the relationship TW/RW≥0.7. Thus, there is a greater change in the angle of the outer face from the tread 20 to the tire side portion 22 in a tire width direction cross-section view, such that the ground contact position of the tread 20 is not liable to move toward the tire width direction outside. Thus, the ground contact portion on the lateral force input side does not bulge out to the width direction outside where the belt layer 16 are not present due to asymmetrical deformation during run-flat running, thereby suppressing an increase in asymmetrical deformation.

Figure 3A:
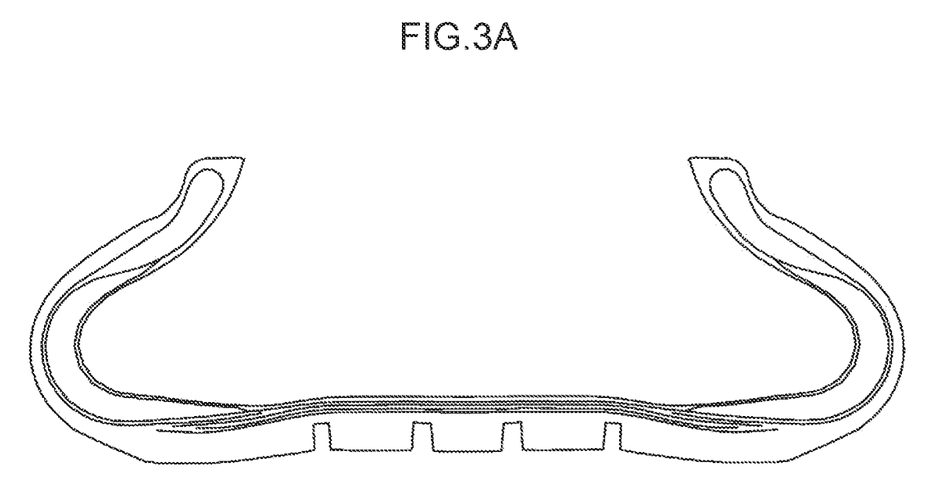
FIG. 3A is a cross-section of a run-flat radial tire, illustrating a case in which asymmetrical deformation has not occurred.
Figure 3B:
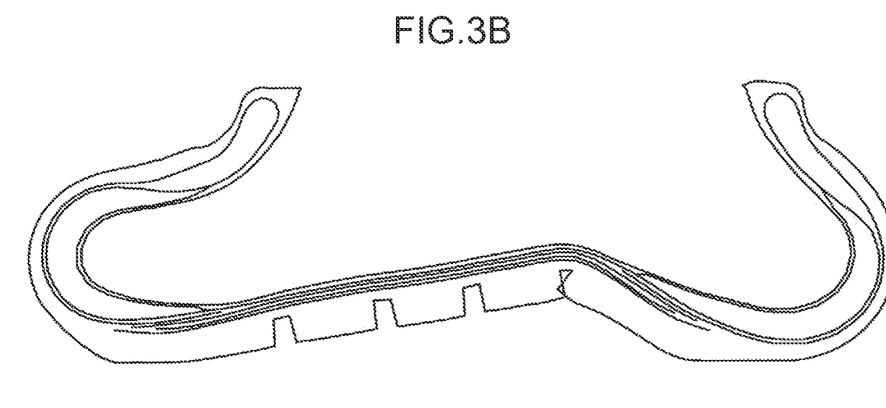
FIG. 3B is a cross-section of a run-flat radial tire, illustrating a case in which asymmetrical deformation has occurred.

A brief explanation follows regarding asymmetrical deformation. FIG. 3A is a cross-section illustrating a case in which asymmetrical deformation has not occurred in a run-flat radial tire. FIG. 3B is a cross-section illustrating a case in which asymmetrical deformation has occurred in a run-flat radial tire.

Figure 4A:
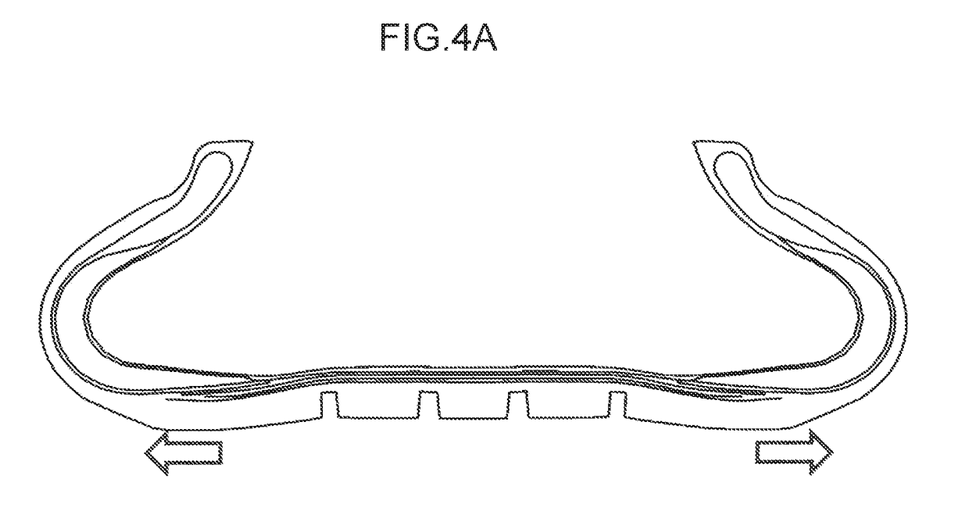
FIG. 4A is a cross-section of a run-flat radial tire, illustrating a state in which asymmetrical deformation has not occurred, and force toward the width direction outsides is substantially balanced between both ground contact ends.
Figure 4B:
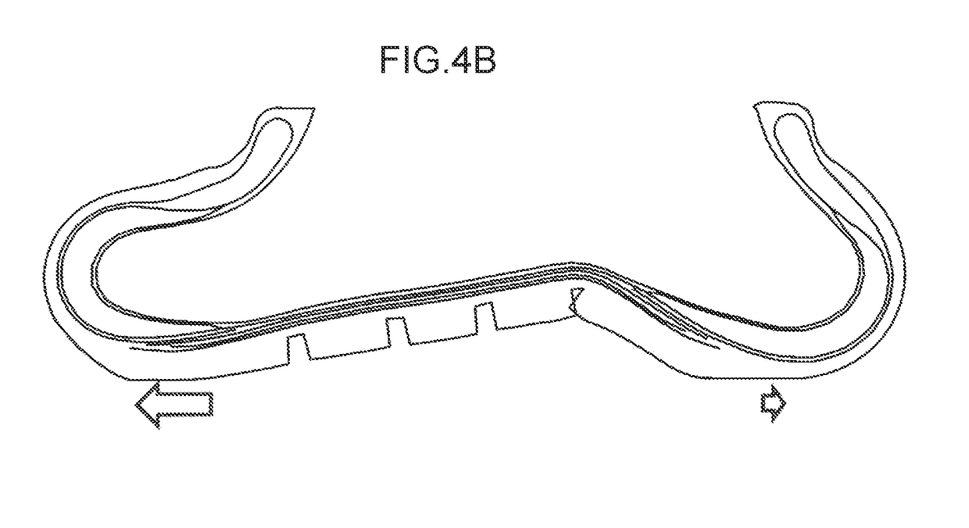
FIG. 4B is a cross-section of a run-flat radial tire, illustrating a state in which asymmetrical deformation has occurred and an imbalance has arisen.

In the run-flat radial tire illustrated in FIG. 4A, asymmetrical deformation has not occurred, and force toward the width direction outsides is substantially balanced between both ground contact portion ends. In contrast thereto, in the run-flat radial tire illustrated in FIG. 4B, asymmetrical deformation has occurred, and the belt layers are not present at the ground contact portion on the lateral force input side (namely, the right side of the drawing), such that force toward the width direction outsides arising at both ground contact portion ends becomes weaker, and an imbalance arises.

Figure 5:
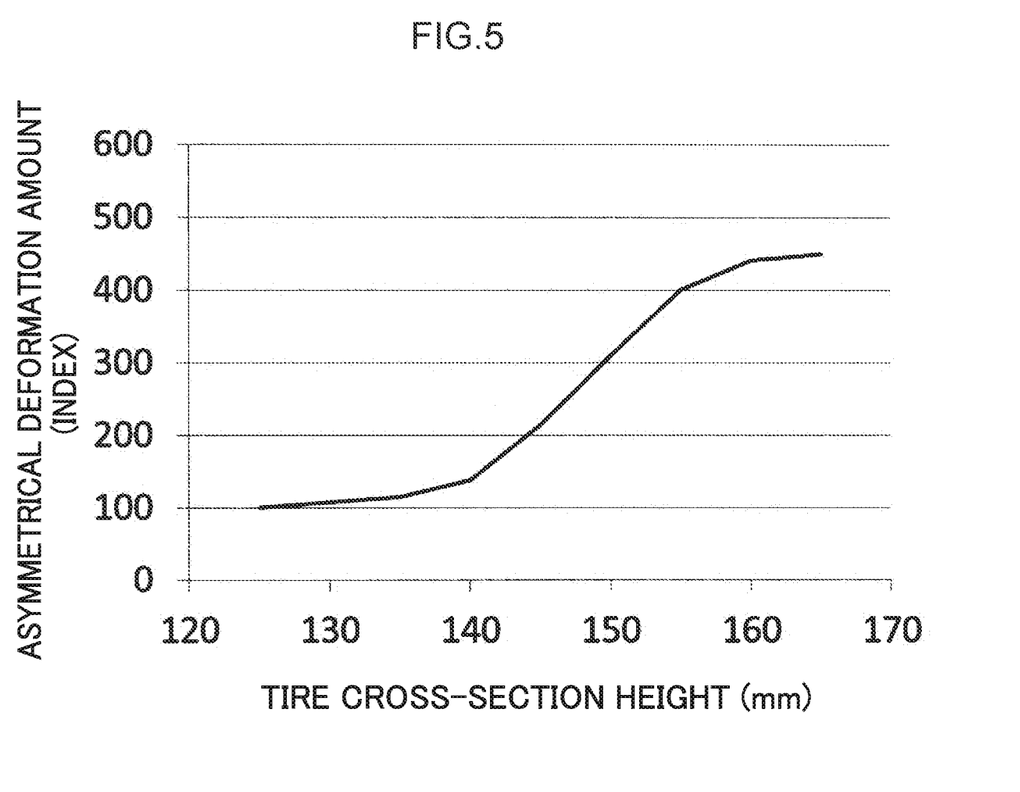
FIG. 5 is a line graph illustrating a relationship between tire cross-section height and asymmetrical deformation amount.

As illustrated in FIG. 5, the amount (index) of asymmetrical deformation rapidly increases when the tire cross-section height passes approximately 140 mm.

The disclosure of Japanese Patent Application No. 2016-0091923, filed on Apr. 28, 2016, is incorporated in its entirety by reference herein. All cited documents, patent applications, and technical standards mentioned in the present specification are incorporated by reference in the present specification to the same extent as if each cited document, patent application, or technical standard was specifically and individually indicated to be incorporated by reference.

The invention claimed is:

1. A run-flat radial tire comprising:
    a carcass that straddles between a pair of bead portions;
    side-reinforcing rubber that is provided at a tire side portion, and that extends in a tire radial direction along an inner face of the carcass;
    a belt layer that includes at least two layers and that is provided at a tire radial direction outer side of the carcass, each layer including a cord extending in a direction inclined with respect to a tire circumferential direction such that the cords of the belt layer intersect each other as viewed along the tire radial direction; and
    a tread that is provided at the tire radial direction outer side of the belt layer;
    a tire cross-section height SH satisfying SH≥145 mm,
    a ground contact width TW of the tread and a maximum tire width direction width B of the belt layer satisfying TW<B,
    in a tire width direction cross-section view, an angle θ formed between a tire outer face and the tire width direction at a position at 0.8SH toward the tire radial direction outer side of a bead base portion of the bead portions being no less than 60°,
    a shoulder portion circumferential direction sipe being disposed in the tread,
    in the tire width direction cross-section view, an upper end portion of the side-reinforcing rubber is positioned further toward a tire width direction inner side than the shoulder portion circumferential direction sipe,
    an inner side circumferential direction sipe being disposed further toward the tire width direction inner side than the shoulder portion circumferential direction sipe,
    a sipe width of the shoulder portion circumferential direction sipe being formed wider than that of the inner side circumferential direction sipe, and
    a sipe depth of the shoulder portion circumferential direction sipe being formed shallower than that of the inner side circumferential direction sipe.

2. The run-flat radial tire of claim 1, wherein, in the tire width direction cross-section view, a minimum radius of curvature of a side wall upper portion of the tire side portion positioned on a tread side of the tire side portion is no greater than 40 mm.

3. The run-flat radial tire of claim 1, wherein a distance WA between belt layer side ends of the side-reinforcing rubber on either tire width direction side and the ground contact width TW of the tread satisfy WA≤0.9 TW.

4. The run-flat radial tire of claim 1, wherein the maximum tire width direction width B of the belt layer satisfies B/TW≥1.0.

5. The run-flat radial tire of claim 1, wherein a tire maximum width W satisfies TW/W≥0.5.

6. The run-flat radial tire of claim 1, wherein a rim width RW satisfies TW/RW≥0.7.

7. The run-flat radial tire of claim 1, wherein, in the tire width direction cross-section view, a minimum radius of curvature of a side wall upper portion of the tire side portion positioned on a tread side of the tire side portion is no greater than 40 mm; and a distance WA between belt layer side ends of the side-reinforcing rubber on either tire width direction side and the ground contact width TW of the tread satisfy WA≤0.9 TW.

8. The run-flat radial tire of claim 1, wherein, in the tire width direction cross-section view, a minimum radius of curvature of a side wall upper portion of the tire side portion positioned on a tread side of the tire side portion is no greater than 40 mm; and the maximum tire width direction width B of the belt layer satisfies B/TW≥1.0.

9. The run-flat radial tire of claim 1, wherein, in the tire width direction cross-section view, a minimum radius of curvature of a side wall upper portion of the tire side portion positioned on a tread side of the tire side portion is no greater than 40 mm; and the tire maximum width W satisfies TW/W≥0.5.

10. The run-flat radial tire of claim 1, wherein, in the tire width direction cross-section view, a minimum radius of curvature of a side wall upper portion of the tire side portion positioned on a tread side of the tire side portion is no greater than 40 mm; and the rim width RW satisfies TW/RW≥0.7.

11. The run-flat radial tire of claim 1, wherein a distance WA between belt layer side ends of the side-reinforcing rubber on either tire width direction side and the ground contact width TW of the tread satisfy WA≤0.9 TW; and the maximum tire width direction width B of the belt layer satisfies B/TW≥1.0.

12. The run-flat radial tire of claim 1, wherein a distance WA between belt layer side ends of the side-reinforcing rubber on either tire width direction side and the ground contact width TW of the tread satisfy WA≤0.9 TW; and the tire maximum width W satisfies TW/W≥0.5.

13. The run-flat radial tire of claim 1, wherein a distance WA between belt layer side ends of the side-reinforcing rubber on either tire width direction side and the ground contact width TW of the tread satisfy WA≤0.9 TW; and the rim width RW satisfies TW/RW≥0.7.

14. The run-flat radial tire of claim 1, wherein the maximum tire width direction width B of the belt layer satisfies B/TW≥1.0; and the tire maximum width W satisfies TW/W≥0.5.

15. The run-flat radial tire of claim 1, wherein the maximum tire width direction width B of the belt layer satisfies B/TW≥1.0; and the rim width RW satisfies TW/RW≥0.7.

16. The run-flat radial tire of claim 1, wherein a tire maximum width W satisfies TW/W≥0.5; and the rim width RW satisfies TW/RW≥0.7.

17. The run-flat radial tire of claim 1, wherein, in the tire width direction cross-section view, a minimum radius of curvature of a side wall upper portion of the tire side portion positioned on a tread side of the tire side portion is no greater than 40 mm;

a distance WA between belt layer side ends of the side-reinforcing rubber on either tire width direction side and the ground contact width TW of the tread satisfy WA≤0.9 TW; and the maximum tire width direction width B of the belt layer satisfies B/TW≥1.0.

18. The run-flat radial tire of claim 1, wherein, in the tire width direction cross-section view, a minimum radius of curvature of a side wall upper portion of the tire side portion positioned on a tread side of the tire side portion is no greater than 40 mm;

a distance WA between belt layer side ends of the side-reinforcing rubber on either tire width direction side and the ground contact width TW of the tread satisfy WA≤0.9 TW; and the tire maximum width W satisfies TW/W≥0.5.

19. The run-flat radial tire of claim 1, wherein, in the tire width direction cross-section view, a minimum radius of curvature of a side wall upper portion of the tire side portion positioned on a tread side of the tire side portion is no greater than 40 mm;

a distance WA between belt layer side ends of the side-reinforcing rubber on either tire width direction side and the ground contact width TW of the tread satisfy WA≤0.9 TW; and the rim width RW satisfies TW/RW≥0.7.

20. The run-flat radial tire of claim 1, wherein, in the tire width direction cross-section view, a minimum radius of curvature of a side wall upper portion of the tire side portion positioned on a tread side of the tire side portion is no greater than 40 mm;

the maximum tire width direction width B of the belt layer satisfies B/TW≥1.0; and the tire maximum width W satisfies TW/W≥0.5.

21. The run-flat radial tire of claim 1, wherein a position of a tire maximum width W is no less than 0.6 SH from a tire radial direction outer side of a bead base portion.

22. The run-flat radial tire of claim 1, wherein a tread height difference TH is no greater than 4.5% of the ground contact width TW of the tread.

* * * * *